(12) United States Patent
Liebold

(10) Patent No.: US 12,491,744 B2
(45) Date of Patent: Dec. 9, 2025

(54) METHOD FOR CONTROLLING AN ACTIVE CHASSIS

(71) Applicant: Dr. Ing. h.c. F. Porsche Aktiengesellschaft, Stuttgart (DE)

(72) Inventor: Jochen Liebold, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 64 days.

(21) Appl. No.: 18/426,511

(22) Filed: Jan. 30, 2024

(65) Prior Publication Data
US 2024/0308289 A1  Sep. 19, 2024

(30) Foreign Application Priority Data

Mar. 14, 2023 (DE) ...................... 10 2023 106 353.7

(51) Int. Cl.
*B60G 17/0165* (2006.01)
*B60G 17/019* (2006.01)

(52) U.S. Cl.
CPC ... *B60G 17/0165* (2013.01); *B60G 17/01908* (2013.01); *B60G 2400/102* (2013.01);
(Continued)

(58) Field of Classification Search
CPC .......... B60G 17/0165; B60G 17/01908; B60G 2204/81; B60G 2400/102; B60G 2400/204; B60G 2400/51; B60G 2400/823; B60G 2400/954; B60G 2401/14; B60G 2500/30; B60G 2600/0422; B60G 2600/182; B60G 2800/014; B60G 2800/16
See application file for complete search history.

(56) References Cited

U.S. PATENT DOCUMENTS 4,975,849 A * 12/1990 Ema ................... B60G 17/0162
280/5.506
5,908,217 A * 6/1999 Englar ................... B62D 35/00
296/180.1
(Continued)

FOREIGN PATENT DOCUMENTS

DE 102004036682 A1 3/2006
DE 102012015492 A1 2/2014
(Continued)

*Primary Examiner* — Carl C Staubach
(74) *Attorney, Agent, or Firm* — Buchanan Ingersoll & Rooney PC

(57) ABSTRACT

In a method for controlling an active chassis of a vehicle, an obstacle is identified on a travel route located in front of a wheel of a front axle. A spring-shock absorber force of the spring-shock absorber system of the corresponding wheel is adjusted depending on the geometry of the obstacle such that the vehicle body experiences the lowest possible vertical acceleration when driving over the obstacle. Data from the front axle driving over the obstacle is then evaluated and adjustments are made for balancing the rear axle as it drives over the obstacle. When the rear axle drives over the obstacle, adjustments are made to at least one wheel of the rear axle, taking into account the adjustments due to the front axle driving over the obstacle, such that the vehicle body does not experience any vertical acceleration when the rear axle drives over the obstacle.

20 Claims, 1 Drawing Sheet

(52) U.S. Cl.
CPC .... *B60G 2400/204* (2013.01); *B60G 2400/51* (2013.01); *B60G 2400/823* (2013.01); *B60G 2400/954* (2013.01); *B60G 2401/14* (2013.01); *B60G 2800/014* (2013.01)

(56) References Cited

U.S. PATENT DOCUMENTS

| | | | | |
|---|---|---|---|---|
| 6,412,788 | B1* | 7/2002 | Ichimaru | B60G 17/0165 |
| | | | | 280/5.515 |
| 7,133,755 | B2* | 11/2006 | Salman | B60T 8/885 |
| | | | | 701/30.7 |
| 8,762,000 | B2* | 6/2014 | Schindler | B60G 17/018 |
| | | | | 701/41 |
| 10,052,927 | B2* | 8/2018 | Maise | B60G 17/015 |
| 10,202,211 | B2* | 2/2019 | Zhou | B64G 1/244 |
| 2017/0080770 | A1* | 3/2017 | Irwin | B62D 35/00 |
| 2020/0072705 | A1* | 3/2020 | Kasaiezadeh Mahabadi | |
| | | | | G01L 25/00 |
| 2020/0094645 | A1* | 3/2020 | Edren | B60W 10/22 |
| 2020/0172118 | A1* | 6/2020 | Peters | B60W 30/02 |
| 2021/0146742 | A1* | 5/2021 | Lee | B60G 17/0165 |
| 2021/0178845 | A1* | 6/2021 | Cho | B60G 17/0182 |
| 2023/0019390 | A1* | 1/2023 | Wei | B60G 17/0165 |
| 2023/0076272 | A1* | 3/2023 | Kim | B60G 17/0182 |
| 2024/0001932 | A1* | 1/2024 | Birch | B60W 30/18172 |
| 2024/0067254 | A1* | 2/2024 | Weston | B62D 1/046 |
| 2024/0132053 | A1* | 4/2024 | De Pinto | B60W 40/112 |
| 2025/0065902 | A1* | 2/2025 | Giovanardi | B60W 50/0097 |

FOREIGN PATENT DOCUMENTS

| | | |
|---|---|---|
| DE | 102020107878 A1 | 2/2021 |
| EP | 4067126 A1 | 10/2022 |

* cited by examiner

METHOD FOR CONTROLLING AN ACTIVE CHASSIS

CROSS-REFERENCE TO RELATED APPLICATION

This application claims priority to German Patent Application No. 10 2023 106 353.7, filed Mar. 14, 2023, the content of such application being incorporated by reference herein in its entirety.

FIELD OF THE INVENTION

The invention relates to a method for controlling an active chassis of a vehicle, a device for operating an active chassis of a vehicle and a vehicle comprising the device according to aspect of the invention.

BACKGROUND OF THE INVENTION

A widespread aim in the development of modern vehicle chassis is to decouple the vehicle body as far as possible from the movements of the individual vehicle wheels when driving over obstacles such as potholes, speed bumps or other unevenness in the road surface, so that ideally no force is transmitted to the vehicle body. In this way, both driving comfort and driving safety can be improved. In the context of this application, the vehicle body is understood to mean the chassis and the bodywork and thus also the vehicle interior. The vehicle body therefore comprises all elements of the vehicle that are decoupled from the edges by the chassis.

Due to the resulting spring and shock absorbing forces of the spring-shock absorber system of the chassis, driving over an obstacle causes high body acceleration, which is perceived as uncomfortable and should therefore be avoided. If the vehicle is on a level road, no vertical acceleration acts on the vehicle body. The vehicle therefore remains at rest and does not move in a vertical direction. Driving over a bump or an obstacle causes the spring-shock absorber system to compress, wherein the acceleration on the body (body acceleration) is increased via the spring rate of the spring and thus a movement is transferred to the body in a vertical direction. At the same time, the change in shock absorber travel during compression results in a change in speed, wherein the force acting on the vehicle body in the vertical direction is also increased if the shock absorbing constant is not variable, which also leads to additional acceleration on the vehicle body.

In order to reduce these vertical accelerations on the vehicle body, DE 10 2020 107 878 A1 and EP 4067126 A1, which are incorporated by reference herein, for example, disclose active chassis systems which provide options for reducing the accelerations acting on the vehicle body when driving over obstacles by changing the shock absorbing properties. An active chassis system or active chassis is therefore to be understood as a chassis system in which the shock absorbing properties can be adjusted.

DE 10 2012 015 492 A1 and DE 10 2004 036 682 A1 which are incorporated by reference herein, disclose a method for operating an active chassis of a vehicle in which at least one actuator unit is proactively controlled based on a height profile of a preceding travel route, e.g. in order to proactively raise the vehicle or individual wheels of the vehicle before driving over an obstacle.

Against the background described above, it would be desirable to further develop the existing systems in order to improve both driving comfort and driving safety for the vehicle occupants.

SUMMARY OF THE INVENTION

A method according to aspect of the invention for controlling an active chassis of a vehicle having a front axle, at least one rear axle and a vehicle body has multiple steps. First of all, an obstacle is identified on a travel route in front of a wheel of the front axle in the direction of travel. Preferably, the position of the obstacle, the horizontal extension of the obstacle and the vertical extension of the obstacle are identified. The horizontal extension is understood to be the two-dimensional geometry on the roadway, while the height or depth of the obstacle and the changes in height are understood to be the vertical extension. If one or both wheels of the front axle are located on an identified obstacle, a spring-absorber force of the spring-absorber system of the corresponding wheel is adjusted depending on the geometry of the obstacle in such a way that the vehicle body experiences the lowest possible vertical acceleration when driving over the obstacle. In other words, the corresponding wheel is proactively raised or lowered vertically by the spring-shock absorber system depending on the geometry of the obstacle by adjusting the spring-shock absorber force, so that the obstacle causes the least possible vertical acceleration on the vehicle body. As the geometry of the obstacle cannot be perfectly detected by the sensor system, a residual vertical acceleration of the vehicle body cannot be ruled out when the front axle drives over the obstacle.

In a further method step, data from the driving of the front axle over the obstacle is then evaluated and adjustments are derived for balancing of the rear axle as it drives over the obstacle. This data recorded at the front axle preferably comprises a vertical movement of the wheel, a measured vertical force on the wheel induced by the obstacle and/or a residual vertical acceleration transferred to the body.

In a further method step, when the rear axle drives over the obstacle, adjustments are made to at least one wheel of the rear axle, taking into account the adjustments due to the front axle driving over the obstacle, in such a way that the vehicle body does not experience any vertical acceleration when the rear axle drives over the obstacle.

The method according to aspect of the invention makes it possible to significantly improve the control of the rear axle driving over the obstacle and thus to significantly reduce the vertical acceleration of the body, at least when the rear axle drives over the obstacle.

In an advantageous embodiment of the invention, the spring-shock absorber force is set on the basis of a calculated imaginary force which the driving over the obstacle would have on the vehicle body without the adjustment of the spring-shock absorber force, wherein the imaginary force caused by the obstacle is subtracted from a static force which the spring-shock absorber system applies when driving without driving over an obstacle. The imaginary force is determined by taking into account the geometry of the obstacle, i.e. the horizontal and vertical extension and the gradient of the obstacle.

In an advantageous embodiment of the invention, the obstacle is identified after the front axle has driven over the obstacle before the rear axle drives over it. As a result, the time at which the vehicle drives over the obstacle can be precisely predicted, even in the event of a change in speed, and the control of the spring-shock absorber force can be made more precise.

It is also preferable to identify the obstacle in front of the front axle and/or in front of the rear axle using sensors, in particular optical sensors. In particular, detection using optical sensors can be implemented easily and reliably. The use of sensors has the advantage that even short-term changes in the obstacle can be identified by the sensors just shortly before the vehicle drives over. This makes false detections or incorrect information less likely.

As an alternative or in addition to detection by sensors, information provided externally to the vehicle, such as from a database or from other vehicles, can also be used and preferably compared with the data from the sensor identification in order to make the identification of the obstacle as precise as possible. Externally provided data can be particularly useful for structurally integrated obstacles such as speed bumps, curves on race tracks or the like.

In a preferred embodiment of the invention, the time at which the rear axle drives over the obstacle is determined using the time at which the front axle drives over the obstacle, a vehicle speed and a wheelbase, i.e. the distance between the front and rear axles. Using these three parameters, the time at which the rear axle drives over can be calculated as a function of the time at which the front axle drives over. Embodiments are also conceivable in which both sensor identification of the obstacle, external information and the calculation of the time of the driving over an obstacle are carried out using the three parameters mentioned above. Since the time at which the obstacle is driven over is a decisive factor for the quality of the control of the spring-shock absorber force, it is particularly advantageous to use as much information as is available to determine it, so that if one of the possibilities is detected incorrectly or implausibly, a sufficiently precise prediction of the time at which the obstacle is driven over can still be determined.

In a further preferred embodiment of the invention, a measurement of a vertical movement of the wheel on the front axle or the rear axle is carried out during the driving over of the front axle or the rear axle using at least one appropriately positioned acceleration sensor and/or at least one pressure sensor. The pressure sensor is provided in particular in the spring-shock absorber system of the corresponding wheel. Preferably, the data determined in this way is used to control the spring-shock absorber force and/or to evaluate the driving of the front axle over the obstacle, which then flows into the control of the spring-shock absorber force when the rear axle drives over the obstacle.

In a further advantageous embodiment of the invention, a vehicle level is adjusted to the obstacle after the obstacle has been identified on the travel route. If, for example, the identification of the obstacle reveals that the vehicle is too low at the corresponding point in time, so that there is insufficient spring travel when driving over the obstacle in order to achieve a driving over with the lowest possible vertical body acceleration, the vehicle can be raised slightly by means of the active chassis in order to provide sufficient opportunity to compensate for the obstacle. In this way, this can be further improved and at the same time it can be ensured that a low ground clearance can be implemented if necessary when driving without driving over an obstacle.

The device according to aspect of the invention for operating an active chassis of a vehicle has a sensor unit which is designed to detect an obstacle on a travel route in front of the front axle of the vehicle in the direction of travel and to forward it to a control unit. The control unit is designed to adjust a spring-shock absorber force of a wheel of the vehicle traveling over the obstacle in such a way that a vehicle body experiences the lowest possible vertical acceleration when driving over the obstacle. Furthermore, an evaluation unit is provided, which is designed to evaluate data from the driving of a front axle of the vehicle over the obstacle and to transmit instructions to the control unit for balancing of a rear axle of the vehicle that subsequently passes over the obstacle. The control unit is also designed to adjust the spring-shock absorber force on a wheel of the rear axle of the vehicle that is traveling over the obstacle, taking into account the evaluation of the evaluation unit.

Using the device according to aspect of the invention, the method according to aspect of the invention can be implemented in order to ensure the best possible control of the chassis when driving over an obstacle.

In an advantageous embodiment of the device according to aspect of the invention, the sensor unit has optical sensors for identifying the obstacle. It is also possible to use non-optical sensors as an alternative or in addition.

The vehicle according to aspect of the invention has a device according to aspect of the invention.

BRIEF DESCRIPTION OF THE DRAWINGS

Advantageous embodiments and aspects of the invention are described in more detail below with reference to the accompanying figures.

DETAILED DESCRIPTION OF THE INVENTION

Figure 1:
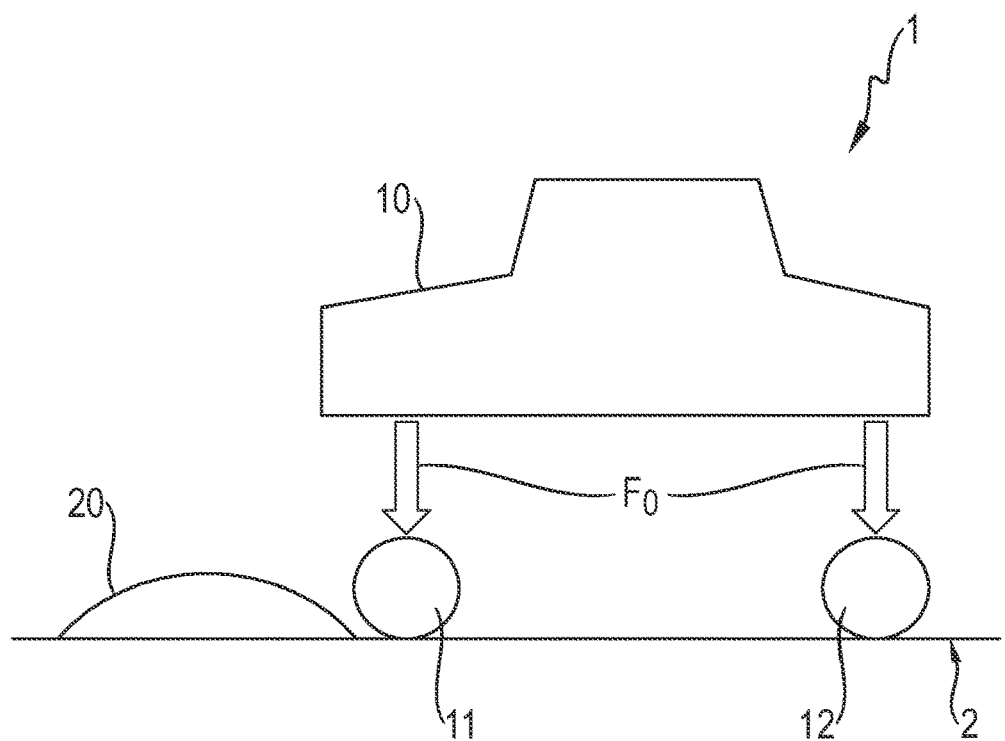
FIG. 1 shows a schematic representation of a vehicle 1 before driving over an obstacle 20.

FIG. 1 shows a schematic representation of a vehicle 1 before driving over an obstacle 20. Schematically shown are a vehicle body 10, a front axle 11 and a rear axle 12 of the vehicle 1, which is moving on a travel route 2. In the direction of travel of the vehicle 1, an obstacle in the form of a speed bump is shown on the travel route 2.

The obstacle 20 is identified by a suitable sensor system of the vehicle 1, such as a corresponding optical sensor system. Information about the position of the obstacle 20 and thus also its horizontal extent as well as its height and change in height or gradient, i.e. the vertical extent of the obstacle 20, is recorded as precisely as possible. Based on the information recorded about the obstacle 20, a static force $F_0$ is applied or increased if necessary by shock absorbers of a spring shock absorber system of the vehicle 1, which leads to the vehicle level being raised and the vehicle body 10 thus having a higher ground clearance. The static force $F_0$ is applied or increased as slowly as possible so that no noticeable vertical accelerations occur on the vehicle body 10.

If the sensor system identifies that the wheels of the front axle 11 have reached the obstacle 20, a spring-shock absorber force $F_D$ is adjusted depending on the geometry of the obstacle 20 in such a way that the body acceleration is as low as possible when driving over the obstacle 20.

Figure 2:
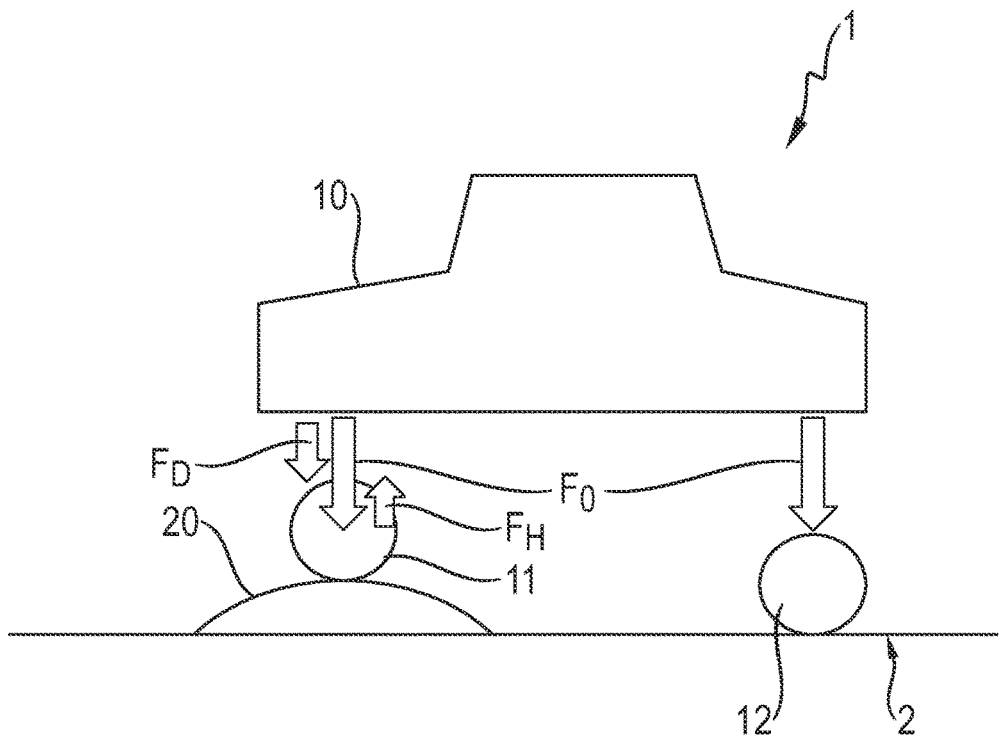
FIG. 2 shows a schematic representation of the vehicle 1 of FIG. 1 when driving over the obstacle 20 using the method according to aspect of the invention.

FIG. 2 schematically shows the front axle 11 of the vehicle 1 driving over the obstacle 20. The spring-shock absorber force $F_D$ is adjusted as follows. By knowing the geometry of the obstacle 20, the vertical force that would act on the vehicle body 10 when driving over the obstacle 20 without using the method according to aspect of the invention is calculated. On the one hand, this force results from the change in the position of the illustrated wheel in the vertical direction, since Hook's law ($F=D·\Delta x$) results in a directly proportional relationship between the force F and the change in spring travel $\Delta x$ at a constant spring stiffness D. The change in position of the wheel also results in a change in speed $\Delta v$, which also leads to a change in the force on the vehicle body 10 due to the mathematical equation of the shock absorbing constant $d=F/\Delta x$.

The imaginary force $F_H$ induced by the obstacle, which can thus be calculated as a function of the geometry of the obstacle 20, is therefore subtracted from the static force $F_0$ to obtain the spring-shock absorber force $F_D$, which is provided by the spring-shock absorber system of the corresponding wheel when driving over the obstacle 20. When the front axle 11 drives over the obstacle 20 as shown in FIG. 2, the spring-shock absorber force $F_D$ is set accordingly via the spring shock absorber system of the front axle 11. The spring-shock absorber force $F_D$ is therefore adjusted as a function of the geometry of the obstacle 20 so that the vertical body acceleration is as low as possible (ideally none at all) when the vehicle drives over the obstacle 20. However, due to a possibly imperfect identification of the geometry of the obstacle 20, it is not possible to prevent the vehicle body 10 from experiencing a slight vertical acceleration.

During the driving of the front axle 11 over the obstacle 20, corresponding data is collected at the front axle 11. This preferably comprises an acceleration of the wheel in the vertical direction in order to determine the geometry of the obstacle 20 again and in a different way when driving over it and to compare it with the data recorded in another way (e.g. by optical sensors). Furthermore, the possibly occurring body acceleration and the pressure change in the shock absorber of the wheel caused by driving over an obstacle are preferably recorded.

The data recorded in this way is then evaluated and corresponding adjustments to the spring-shock absorber force $F_D$ are derived for an optimum driving over an obstacle. These adjustments are taken into account when the rear axle 12 drives over the obstacle so that the body acceleration can be further minimized when the rear axle 12 drives over the obstacle 20.

To detect when the rear axle 12 is at the obstacle 20, sensors, in particular optical sensors, are preferably located in front of the rear axle 12. Alternatively or additionally, the time can be calculated using the wheelbase of the vehicle 1, the speed of the vehicle 1 and the time at which the front axle 11 drives over the obstacle 20. Furthermore, sensors can also be provided on the front axle 11 and rear axle 12, which detect the deflection of the corresponding wheels when driving over the obstacle 20 and thus also contribute to improving obstacle identification.

The obstacle 20 can also be in a form of a hollow or depression, wherein the method is adjusted accordingly. It is conceivable that the spring-shock absorber force $F_D$ is increased when passing through the depression, or that it is reduced to zero in order to lift the wheel briefly and touch it down again only after the depression. In other words, the wheel "jumps over" the recess in this embodiment. This is particularly preferable if only one wheel of the axle drives over the obstacle and not both wheels of the axle. In addition, the obstacle must not be too long, as there is no ground contact between the wheel and the travel route 2 during the lifting of the wheel to "jump over" the recess and therefore no force can be transmitted.

The method according to aspect of the invention can therefore be used to control the chassis when driving over obstacles in such a way that body acceleration is minimized in order to increase driving comfort and safety.

What is claimed is:

1. A method for controlling an active chassis of a vehicle having a front axle, a rear axle and a vehicle body, said method comprising:
   (A) identifying an obstacle on a travel route located in front of a wheel of the front axle as viewed in a direction of travel,
   (B) adjusting a spring-shock absorber force ($F_D$) on the wheel of the front axle in such a way that the vehicle body experiences a reduced acceleration when driving over the obstacle,
   (C) evaluating data from the front axle as the front axle was driven over the obstacle and deriving adjustments for balancing of the rear axle based upon the evaluated data, wherein the evaluated data comprises a residual vertical acceleration transferred to the vehicle body,
   (D) adjusting a spring-shock absorber force ($F_D$) on a wheel of the rear axle when the rear axle drives over the obstacle, taking into account the evaluated data from the front axle as the front axle was driven over the obstacle, in such a way that the vehicle body experiences a reduced vertical acceleration.

2. The method according to claim 1, wherein after the front axle has driven over the obstacle, the obstacle is identified before the rear axle drives over the obstacle.

3. The method according to claim 1, wherein the obstacle is identified in front of the front axle and/or the rear axle by sensors.

4. The method according to claim 3, wherein the sensors are optical sensors.

5. The method according to claim 1, wherein the identification of an obstacle comprises a position of the obstacle, an extension in a horizontal direction of the obstacle and an extension in a vertical direction of the obstacle.

6. The method according to claim 1, wherein a time of driving of the rear axle over the obstacle is calculated using a time of driving over of the wheel on the front axle, a vehicle speed and a wheelbase of the vehicle.

7. The method according to claim 1, wherein a measurement of a vertical movement of the wheel on the front axle or on the rear axle is carried out using acceleration sensors and/or pressure sensors when the front axle or the rear axle drives over the obstacle.

8. The method according to claim 1, wherein after identifying an obstacle on the travel route, the method further comprises adjusting a vehicle level to compensate for the obstacle.

9. The method according to claim 1, further comprising accounting for externally provided information on the travel route, on which the vehicle is located, when identifying the obstacle and/or when adjusting the spring-shock absorber force ($F_D$) on the wheel.

10. A device for operating an active chassis of a vehicle, said device comprising:
   a sensor unit configured to (i) detect an obstacle on a travel route located in front of a front axle of the vehicle in a direction of travel and (ii) communicate the detected obstacle to a control unit,
   the control unit being configured to adjust a spring-shock absorber force ($F_D$) of a wheel of the vehicle traveling over the obstacle in such a way that vertical acceleration experienced by a vehicle body of the vehicle is either limited or prevented, and an evaluation unit configured to (i) evaluate data from the front axle of the vehicle as the vehicle is driven over the obstacle and (ii) transmit instructions to the control unit for balancing a rear axle subsequently passing over the obstacle, wherein the evaluated data comprises a residual vertical acceleration transferred to the vehicle body, wherein the control unit is further configured to adjust the spring-shock absorber force ($F_D$) on a wheel of the rear axle of the vehicle traveling over the obstacle, taking into account the evaluation of the evaluation unit.

11. The device according to claim 10, wherein the sensor unit comprises optical sensors.

12. A vehicle comprising the device according to claim 10.

13. The device according to claim 10, wherein the evaluated data additionally comprises either a vertical movement of the wheel of the front axle, or a measured vertical force on the wheel of the front axle induced by the obstacle.

14. The method according to claim 1, wherein the evaluated data additionally comprises either a vertical movement of the wheel of the front axle, or a measured vertical force on the wheel of the front axle induced by the obstacle.

15. The device according to claim 10, wherein the evaluated data additionally comprises a vertical movement of the wheel of the front axle, and a measured vertical force on the wheel of the front axle induced by the obstacle.

16. The method according to claim 1, wherein the evaluated data additionally comprises a vertical movement of the wheel of the front axle, and a measured vertical force on the wheel of the front axle induced by the obstacle.

17. The device according to claim 10, wherein the obstacle is identified in a different way for purposes of the rear axle as compared with the front axle.

18. The method according to claim 1, wherein the obstacle is identified in a different way for purposes of the rear axle as compared with the front axle.

19. The device according to claim 10, wherein the adjustment of the spring-shock absorber force ($F_D$) on the wheel of the rear axle differs from the adjustment of the spring-shock absorber force ($F_D$) on the wheel of the front axle as a function of the evaluated data.

20. The method according to claim 1, wherein the adjustment of the spring-shock absorber force ($F_D$) on the wheel of the rear axle differs from the adjustment of the spring-shock absorber force ($F_D$) on the wheel of the front axle as a function of the evaluated data.

* * * * *